United States Patent [19]

Jensen

[11] Patent Number: 4,781,324

[45] Date of Patent: Nov. 1, 1988

[54] PREHEAT TEMPERATURE BALANCING CONTROL

[75] Inventor: Bruce A. Jensen, Bartlesville, Okla.

[73] Assignee: Applied Automation, Inc., Bartlesville, Okla.

[21] Appl. No.: 115,075

[22] Filed: Oct. 29, 1987

[51] Int. Cl.$^4$ .............................. F23N 1/00; B60H 1/00
[52] U.S. Cl. .................................. 236/15 BF; 165/39; 236/25 R; 364/510
[58] Field of Search ....................... 236/15 B F, 25 R; 165/39; 364/510

[56] References Cited

U.S. PATENT DOCUMENTS

| | | | |
|---|---|---|---|
| 1,930,456 | 10/1933 | Rumble | 236/15 BF |
| 3,450,105 | 6/1969 | Osburn | 122/451 |
| 4,356,863 | 11/1982 | Furr | 165/1 |
| 4,380,317 | 4/1983 | Ryan | 236/15 BF |
| 4,598,669 | 7/1986 | Funk | 364/510 X |
| 4,612,111 | 9/1986 | Hofferber | 208/350 |

Primary Examiner—William E. Wayner
Attorney, Agent, or Firm—George E. Bogatie

[57] ABSTRACT

A supervisory computer automatically equalizes the temperature of effluent streams of a multipass heating system to maximize heat transfer, without substantially disturbing a desired total flow through the heating system. Temperature control is achieved by manipulating the division of a feed stream among the multiple passes. In addition, if the flow in one or more passes cannot be manipulated, the control scheme automatically equalizes the temperatures of the remaining passes. This is accomplished by calculating a flow rate for adjusting the flow through the number of passes under supervisory control to a value, which in addition with any uncontrolled flow, will provide the desired total flow through the heating system. This adjusted flow rate is used as an approximate set point for the flow rate in each controlled pass. The adjusted flow rate signal is modified for control of each individual pass by applyng a bias through a conventional controller acting on a weighted average temperature signal. This temperature biased signal is further modified by applying another bias through a gap controller acting on an average flow signal. The thus twice biased signal is provided as a flow rate set point for it's individual pass.

16 Claims, 4 Drawing Sheets

PREHEAT TEMPERATURE BALANCING CONTROL

The present invention relates to preheating a fluid. In one aspect it relates to apparatus for controlling the splitting of a stream into multiple parallel paths for preheating the fluid in furnace coils and/or heat exchangers. In another aspect it relates to a method for equalizing the outlet temperatures of the fluid flowing in the multiple parallel paths while maintaining a desired total flow of fluid through the multiple paths.

BACKGROUND OF THE INVENTION

It is common practice in various petroleum and chemical operations to heat fluids by using multipass heater systems. As used herein a "pass" is a fluid path through a furnace coil or a heat exchanger coil. A plurality of parallel passes for heating the fluid can be formed by multiple coils disposed in a furnace or by parallel arrangement of heat exchangers or by a combination of multiple furnace coils and heat exchanger passes. The inlet flow of fluid is divided to flow through the separate passes and the heated fluid in the outlet flow from the separate passes is recombined.

It is generally desirable to equalize the outlet temperatures of the fluid flowing in the multiple heat transfer passes so as to substantially maximize the transfer of heat to the fluid flowing through the multiple passes. This may be accomplished by manipulating the flow of fluid in each pass in response to a temperature measurement for each pass so as to maintain the outlet temperatures of all passes substantially equal.

Heater systems of this type are often used for preheating crude oil for introduction into a distillation tower. However, if the crude oil feed rate varies, as will usually be the case, control based on temperature measurements only will not be able to respond to the changing crude oil feed rate. The temperature may change but, since the control is seeking to maintain temperature equality, there may be no change in the position of the control valves in the multiple passes. This may result in an undesired total flow to the crude tower, an undesired liquid level in the crude tower, or an undesired gas/liquid ratio in the tower.

In crude oil fractional distillation it is extremely desirable to utilize various process streams which are associated with the fractional distillation process and which require cooling, to accomplish preheating of the crude oil. Typically heat which can be recovered from the various process streams in liquid-to-liquid heat exchangers is supplemented by a furnace or a plurality of furnaces which supply additional heat to the crude oil feed as required. Therefore a crude oil distillation preheat system can comprise a plurality of parallel passes where a portion of the passes are through furnace coils and the remaining passes are through liquid-to-liquid heat exchangers. Further it is noted that the physical size and the maximum flow rate possible through each of the passes is not necessarily equal.

During the normal course of operation it often happens that flow through one or more of the passes is limited because, for example, the temperature required for equalizing the pass exceeds a maximum temperature limit for the furnace or heat exchanger associated with that pass. Other factors such as maintenance requirements can also restrict operation for one or more of the multiple parallel passes such that manipulating the flow in a particular pass to equalize its temperature with the other passes is not desirable.

SUMMARY OF THE INVENTION

It is thus an object of this invention to provide method and apparatus for equalizing outlet temperatures of a plurality of parallel passes in a preheat system while also maintaining a desired total flow of the heated fluid through the preheat system. It is a further object of this invention to equalize the outlet temperatures of a number of the preheat system passes which can be manipulated, while ignoring the temperature but accounting for the flow of one or more other passes which cannot be manipulated.

In accordance with the present invention, method and apparatus are provided whereby a supervisory computer manipulates the flow rate of multiple heat transfer passes in a preheat system. The flow rates are manipulated in such a manner that the individual temperatures of the passes that can be manipulated under computer control are uniformly maintained while the temperature of other passes in the preheat system, which cannot be manipulated under computer control, are ignored in regards to balancing their temperature with the passes which can be manipulated. In addition a desired total flow of fluid to an associated fractionator is maintained. In this manner, individual passes can be taken out of service or operated at a temperature or flow rate required by some factor, such as a temperature limit or maintenance, without disturbing the balancing of temperatures for the remaining passes.

This is accomplished by providing a flow controller under supervisory computer control to manipulate the flow in each pass, establishing an on-off type status signal for each controller, establishing signals representative of the flow rate and outlet temperatures for each pass, and establishing a signal representative of the total desired flow of feed crude oil to be preheated.

A flow rate is then calculated for adjusting the flow through the passes on supervisory control to a common value, which in addition with any unsupervised flow through the preheat system, will provide a desired total flow through the preheat system. This adjusted flow rate signal is utilzied as an approximate set point for all of the flow controllers which manipulate flow rate in a pass. However, the adjusted flow signal is first biased by a signal responsive to a weighted average temperature and then optionally can be further biased by a signal responsive to the average flow before being presented as a set point signal for the flow controller in a particular pass. Establishing two bias signals for each pass, with each bias signal independently modifying the adjusted temperature signal, provides a means for maintaining a desired split of the total flow between the multiple heat transfer passes that will equalize temperature of the passes while maintaining a desired total flow rate through the preheat system.

The bias signals for each pass act on (1) the difference in a weighted average temperature of all passes on supervisory control and its own actual temperature, and (2) the difference in an average flow of all passes on supervisory control and its own actual flow rate to modify the adjusted flow rate for use as a set point signal. The weighted average temperature signal is obtained by summing the product of flow and temperature for all passes on supervisory control and dividing by the sum of all flows on supervisory control to calculate the weighted average temperature. The average flow bias signal is applied through a flow controller having a dead band so that only the weighted average temperature bias signal is effective for manipulating coil flow unless the flow rate required to control the temperature of a pass causes the flow controller to exceed its deadband.

DESCRIPTION OF THE PREFERRED EMBODIMENTS

While the invention is illustrated and described in terms of a crude oil preheating system, the invention is applicable to the control of any process in which a plurality of heat transfer passes are utilized to heat a fluid stream. Further the invention is illustrated and described in terms of a single furnace which has three coils and also in terms of a preheat system utilizing a combination of furnace and liquid to liquid heat exchangers. However, the invention is applicable to systems which utilize two or more heat transfer passes.

Figure 1:
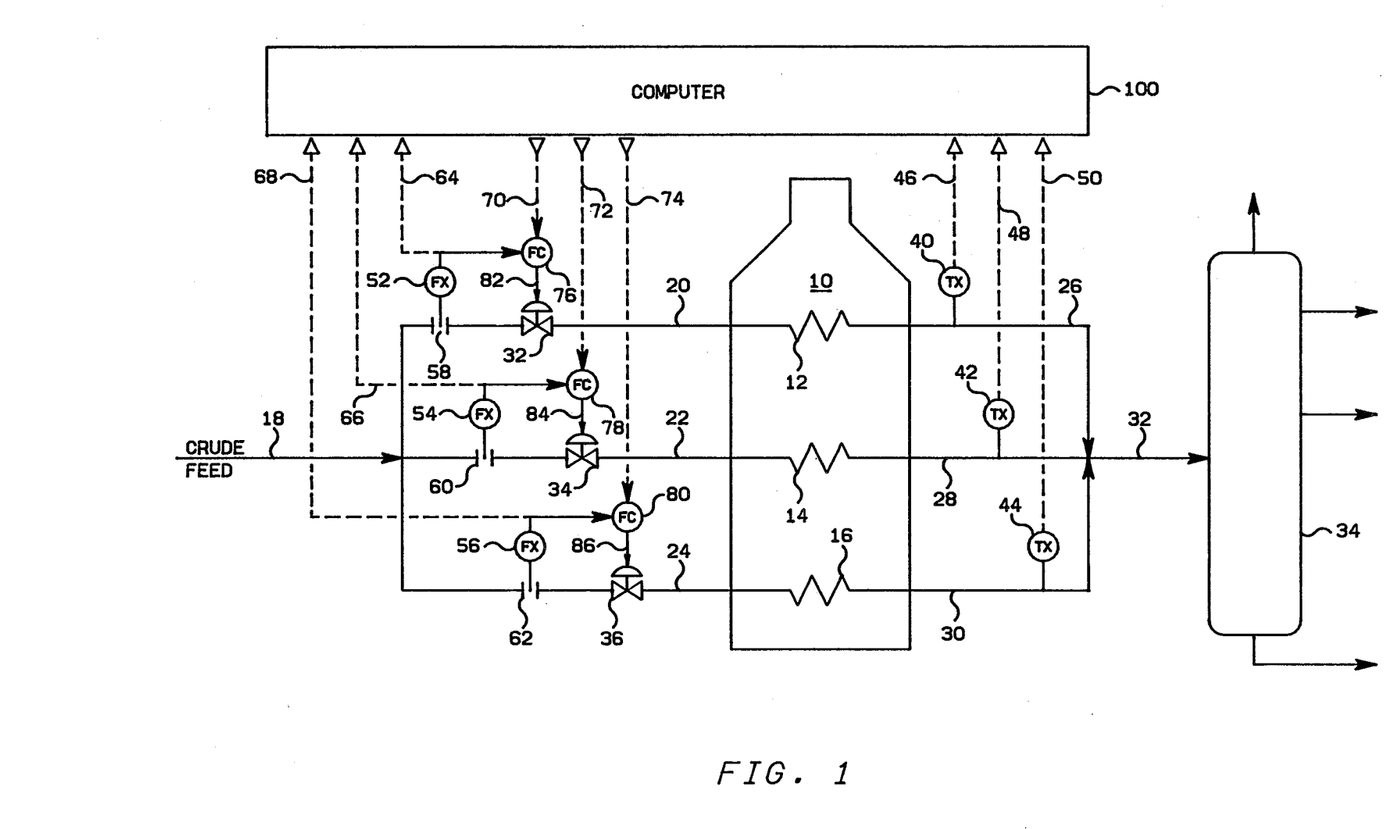
FIG. 1 is a diagrammatic illustration of a preheat furnace having a plurality of heating coils and the associated control system of the present invention.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signal based on measured process parameters as well as set points supplied to the computer. Analog computers or other types of computing devices could also be used in the invention. The digital computer is preferably an OPTROL ® 7000 Process Computer System from Applied Automation, Inc., Bartlesville, Okla.

Signal lines are also utilized to represent the results of calculations carried out in a digital computer and the term "signal" is utilized to refer to such results. Thus, the term "signal" is used not only to refer to electrical currents or pneumatic pressures but is also used to refer to binary representations of a calculated or measured value.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiments of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1 there is shown a furnace 10 which is provided with a plurality of heating coils 12, 14 and 16 which receive heat from combustion of fuel in the furnace. The liquid to be heated is supplied through conduit means 18 and is split to flow through parallel branch conduit means 20, 22 and 24 which extend between conduit means 18 and the inlets of the respective heating coils 12, 14 and 16. Parallel conduits 26, 28 and 30 communicate with the respective outlets of heating coils 12, 14 and 16 and also with conduit means 32 to remove the heated fluid to a subsequent process unit such as a distillation column 34.

The flow through the individual heater coils of furnace 10 is regulated by control valves 32, 34 and 36 which are operably located in respective conduit means 20, 22 and 24. Temperature transducers 40, 42 and 44 in combination with temperature sensing devices such as thermocouples operably located in respective conduit means 26, 28 and 30, provide respective output signals 46, 48 and 50 which are representative of the temperature of the fluid flowing through conduit means 26, 28 and 30 respectively. Signals 46, 48 and 50 are provided from respective temperature transducers 40, 42 and 44 as input signals to computer 100. Flow transducers 52, 54 and 56 in combination with respective flow sensors 58, 60 and 62 operably located in respective conduit means 20, 22 and 24 provide respective output signals 64, 66 and 68 which are representative of the flow rate of fluid in respective conduits 20, 22 and 24. Signals 64, 66 and 68 are provided from respective flow transducers 52, 54 and 56 as inputs to computer 100.

The temperature of fluid flowing in conduit means 32 is essentially maintained by manipulating the flow of combustion fuel to the furnace 10 and is not illustrated since it plays no part in the present invention. The balancing of the temperatures between the coils 12, 14 and 16 is accomplished by manipulating the split of the crude oil flowing through conduit means 18. This control is accomplished by utilizing three control signals provided from computer 100 in response to the above described process measurements.

Signals 70, 72 and 74 are provided from the computer 100 as a respective set point signal to flow controller 76, 78 and 80. Signal 70 is representative of the flow rate of fluid through heating coil 12 required to maintain the temperature of the fluid flowing out of heating coil 12 substantially equal to the weighted average temperature of all furnace passees that are on supervisory computer control as indicated by their status signals, unless the flow rate to equalize the temperature of the fluid flowing out of heating coil 12 requires the flow rate in conduit means 20 to exceed the average flow of all coils on supervisory control by a predetermined margin. If the predetermined flow margin is exceeded, signal 70 is representative of the flow rate in conduit means 20 required to maintain the flow rate of the fluid flowing out of heating coil 12 within the predetermined flow margin.

In a similar manner signal 72 and 74 are respectively representative of the flow rate in conduit means 22 and 24 required to maintain the temperature of the fluid flowing out of heating coils 14 and 16 respectively substantially equal to the weighted average temperature of all furnace passes that are on supervisory control, unless the flow rate to equalize the temperature of the fluid flowing out of the heating coil 14 and 16 respectively requires a flow rate that exceeds the average flow of all coils on supervisory control by predetermined margin. If the predetermined flow margin is exceeded signal 72 and/or signal 74 are representative of the flow rate required to maintain the flow rates within their respective predetermined flow margins.

In response to signal 70, 72 and 74 respective flow controllers 76, 78 and 80 provide respective output signals 82 and 84 and 86 which are responsive to the difference in signals 70 and 64, 72 and 66, and 74 and 68 respectively. Signals 82, 84 and 86 are scaled so as to be representative of the position of respective control valves 32, 34 and 36 which are operably located in respective conduit means 20, 22 and 24 required to maintain the actual flow of fluid through respective conduit means 20, 22 and 24 substantially equal to the desired flow rate represented by respective signals 70, 72 and 74. Signals 82, 84 and 86 are provided from respective flow controller 76, 78 and 80 as control signals for respective control valves 32, 34 and 36 and control valves 32, 34 and 36 are manipulated in response thereto.

Figure 2:
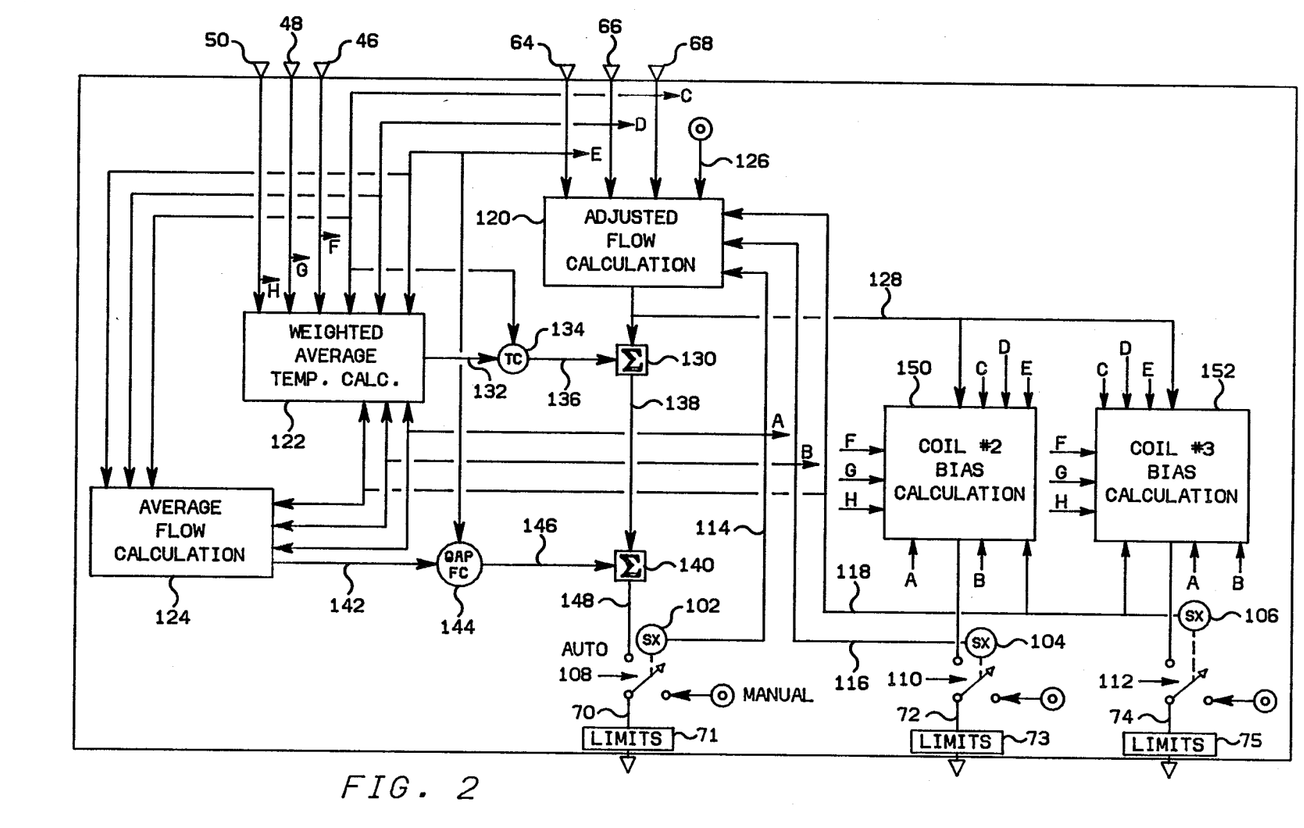
FIG. 2 is a flow diagram of the computer logic utilized to establish the control signals illustrated in FIG. 1, based on the process measurements illustrated in FIG. 1.

Referring now to FIG. 2, generation of control signal 70 will be described in detail, however, generation of signals 72 and 74 will not be described in detail because the generation of signals 72 and 74 is identical to the generation of signal 70. Signals 70, 72 and 74 differ only in their application to different heating coils.

Digital status contact sensors 102, 104 and 106 in combination with auto manual switches 108, 110 and 112 which are associated with respective flow controllers 76, 78 and 80 provide respective logic on/off input signals 114, 116 and 118. Signals 114, 116 and 118 which are representative of "on" or "off" supervisory control status of controller 76, 78 and 80 respectively are provided to computer blocks 120, 122 and 124. The status of controllers 76, 78 and 80 may be provided in any conventional manner. Digital status contacts are illustrated in FIG. 2, however, the status signal could be provided by other means such as a digital input word received through a serial data link.

Also a controller status representative of the controller output being limited as indicated in limit computer blocks 71, 73 and 74 can be maintained internal to the computer 100. If desired the limit status of a controller may be logically combined with its "on" or "off" supervisory control status to provide a resulting status where "on" indicates that a controller is under supervisory control AND its output is not limited and where "off" indicates that a controller is manually controlled OR its output is limited.

Computer block 120 is also provided with an operator entered set point signal 126 which is representative of the desired total flow through the furnace 10, and with signals 64, 66 and 68 which are representative of the respective flow rates flowing through heating coils 12, 14 and 16. In response to status signals 114, 116 and 118, set point signal 126, and flow signals 64, 66 and 68, computer block 120 provides an output signal 128 which is representative of a common flow rate that will adjust the flow through each coil that is on supervisory computer control to a value required to maintain the total flow through furnace 10 substantially equal to the desired flow represented by signal 126. The adjusted flow rate is calculated in computer block 120 in response to the described inputs in accordance with the following equation:

$$F_a = \left(F_t - \sum_{o}^{m} F_c\right)/n \quad \text{(Eq 1)}$$

Where:
 $F_a$ equals adjusted flow, (e.g. mass/time)
 $F_t$ equals total flow represented by signal 126, (e.g. mass/time)
 $F_c$ equals heating coil flows represented by signals 64, 66 and 68, (e.g. mass/time) and
 n equals flow controllers status index for "on" control determined by status signals 114, 116 and 118, (e.g. a whole number $\geq 1$);
 m equals flow controller status index for "off" control determined by status signals 114, 116 and 118 (e.g. a whole number $\geq$ zero).

Signal 128 is provided from computer block 120 as a first input to summing block 130. Flow signal 64, 66 and 68, temperature signals 46, 48 and 50 and status signals 114, 116 and 118 which are all respectively associated with heating coils 12, 14 and 16 in furnace 10 are provided to computer block 122. In response to the described inputs computer block 122 provides an output signal 132 which is representative of a weighted average temperature for the total fluid flowing through heating coils that are on supervisory computer control. The weighted average temperature is calculated in response to the described inputs in accordance with the following equation:

$$T_w = \sum_{1}^{n} T_c \cdot F_c / \sum_{1}^{n} F_c$$

where:
 $T_w$ equals weighted average temperature
 $T_c$ equals heating coil temperature represented by signals 46, 48 and 50, and
 other symbols are as defined above.

Signal 132 is provided from computer block 122 as a set point input to temperature controller 134. Temperature controller 134 is also provided with a process variable signal 46 which is representative of the actual temperature of fluid flowing in conduit means 26. In response to signals 46 and 132 temperature controller 134 provides an output signal 136 which is responsive to the difference between 132 and 46. Signal 136 is scaled so as to be representative of the change in the flow rate of fluid in conduit means 26 required to maintain the actual temperature in conduit means 26 substantially equal to the weighted average temperature represented by signal 132. Signal 136 is provided from flow controller 134 as a second input to summing block 130.

Signal 128 is modified by summing signal 136 with signal 128 in summing block 130. The thus modified signal 138 is representative of the flow rate required in conduit means 20 required to maintain the actual temperature in conduit means 26 substantially equal to the weighted average temperature represented by signal 132. Signal 138 could be provided directly to the set point of flow controller 76 as signal 70, however, it is preferred to further modify signal 138. Signal 138 is therefore provided from summing block 130 as a first input to summing block 140.

An average flow signal 142 is provided from computer block 124 in accordance with the following equation:

$$F_w = \sum_{1}^{n} F_c/n$$

where the symbols are as previously defined.

Signal 142 is provided from computer block 124 as a setpoint input to GAP flow controller 144. As used herein a GAP controller is a controller having an algorithm for control action with a preset deadband configured into it. Control action will occur only outside a margin provided by the deadband, within the deadband no control action will occur. Signal 64 which is representative of the actual flow rate of the fluid flowing conduit means 20 is provided as a process variable input to GAP flow controller 144.

In response to signals 142 and 64 GAP flow controller 144 provides an output signal 146 which is responsive to the difference between signals 142 and 64. Signal 146 is scaled so as to be representative of the change in flow rate of fluid flowing in conduit means 26 required to maintain the actual flow rate in conduit means 26 substantially within the deadband provided in GAP flow controller 144. Thus GAP flow controller 144 will have an output signal equal to zero unless the actual flow rate varies from the average flow represented by signal 142 by more than the deadband value. In this manner the heating coil flow rate represented by signal 64, 66 and 68 are manipulated so as to balance the temperatures so long as the flow rate required does not exceed the average flow rate by more than the margin provided by the deadband in GAP flow controller 144. Signal 138 is modified by summing signal 146 and sigal 138 in summing block 140 to establish signal 148. This modified signal 148 is provided through the auto position of the auto/manual switch 108 and is selected as set point signal 70 when auto/manual switch 108 is in the auto position.

As previously stated a detailed description of the generation of set point signal 72 and 74 is not provided because it is identical to the generation of set point signal 70. However there is illustrated bias calculation blocks 150 and 152 and auto/manual switches 110 and 112 in FIG. 2 for generating set point signals 72 and 74 responsive to the same signals utilized for calculating set point signal 70.

Figure 3:
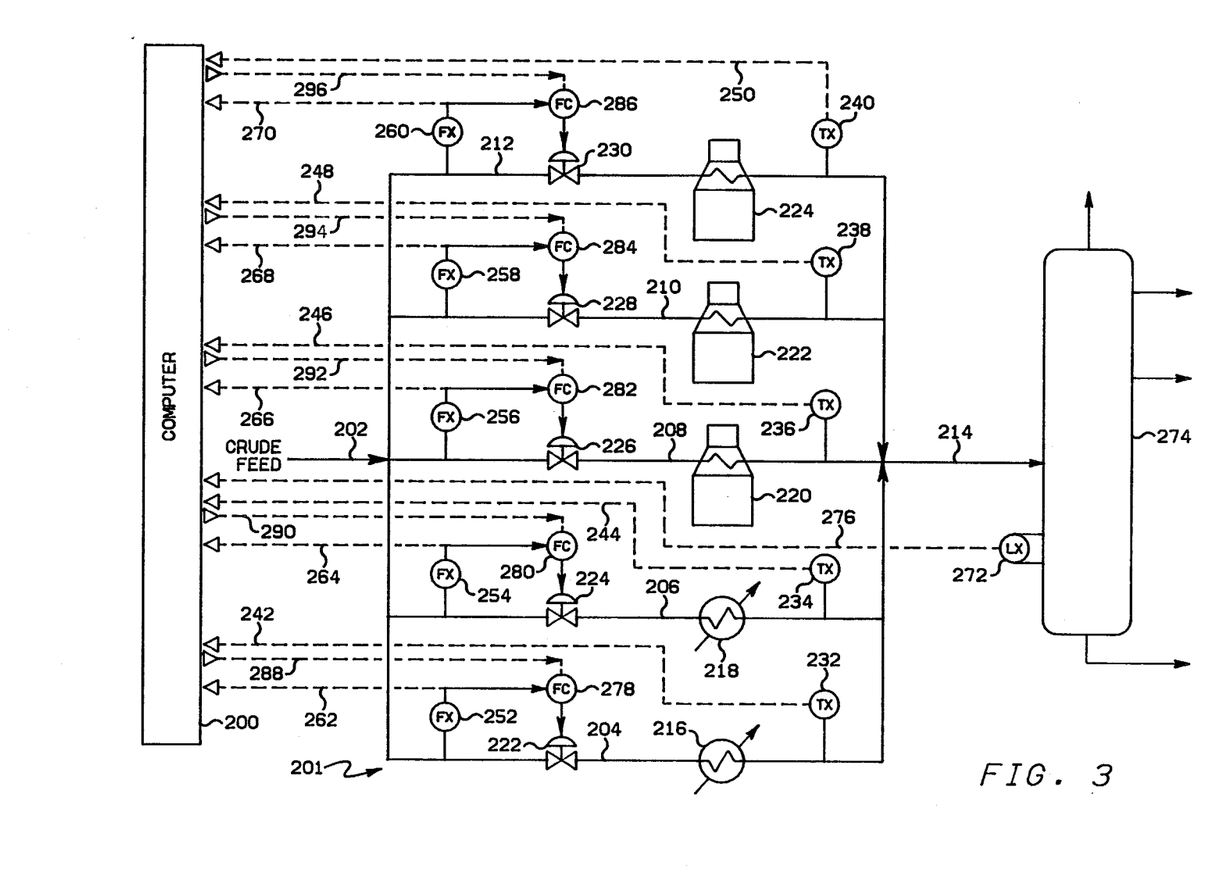
FIG. 3 is a diagrammatic illustration of a crude oil preheat system and the associated control system of the preheat invention.

In another embodiment of this invention, the temperature balancing control is applied to a preheat system comprising five parallel passes as illustrated in FIG. 3. In this embodiment either the liquid level in the fractionator 274 or the total flow rate to the fractionator is controlled while balancing the temperature of all passes that are on supervisory compuror control.

Referring now to FIG. 3 crude oil feed to be preheated is introduced into the system through the preheat feed conduit means 202. Parallel passes 204, 206, 208, 210 and 212 extend between the preheat feed conduit means 202 and the fractionator feed conduit means 214. Passes 204 and 206 circulate crude oil through liquid to liquid heat exchangers 216 and 218 respectively, while passes 208, 210 and 212 circulate crude oil through the radiant section of furnaces 220, 222 and 224 respectively.

Flow through the individual passes of the preheat system generally designated at 201 are regulated by control valves 222, 224, 226, 228 and 230. Temperature sensing transducers 232, 234, 236, 238 and 240 operably located in the heated outlet portions of passes 204, 206, 208, 210 and 212 respectively establish signals 242, 244, 246, 248 and 250 which are representative of the temperature of crude oil flowing through the respective passes. Temperature signals 242, 244, 246, 248 and 250 are provided from the respective transducers as inputs to computer 200.

Flow sensing transducers 252, 254, 256, 258 and 260 operably located in passes 204, 206, 208, 210 and 212 respectively establish signals 262, 264, 266, 268 and 270 which are representative of the flow of crude oil flowing through the respective conduits. Flow signals 262, 264, 266, 268 and 270 are provided from their respective transducers as inputs to computer 200.

Level sensing transducer 272 operably located in the lower part of distillation column 274 establishes a signal 276 which is representative of the level in the distillation column 274. Signal 276 is provided from transducer 272 as an input to computer 200.

In response to the above described inputs computer 200 provides control signals 288, 290, 292, 294 and 296 as respective set point signals to flow controllers 278, 280, 282, 284 and 286. Signal 288 is representative of the flow rate required to maintain the actual temperature in path 204 substantially equal to the weighted average temperature of all passes that are on supervisory computer control, unless the flow rate to equalize the temperature of the heated fluid in pass 204 requires the flow rate in pass 204 to exceed the average flow by a predetermined margin. If the predetermined margin is exceeded, signal 288 is representative of the flow rate in pass 204 required to maintain the flow rate within the predetermined flow margin. In a similar manner, signals 290, 292, 294 and 296 manipulate the flow in respective passes 206, 208, 210 and 212.

Figure 4:
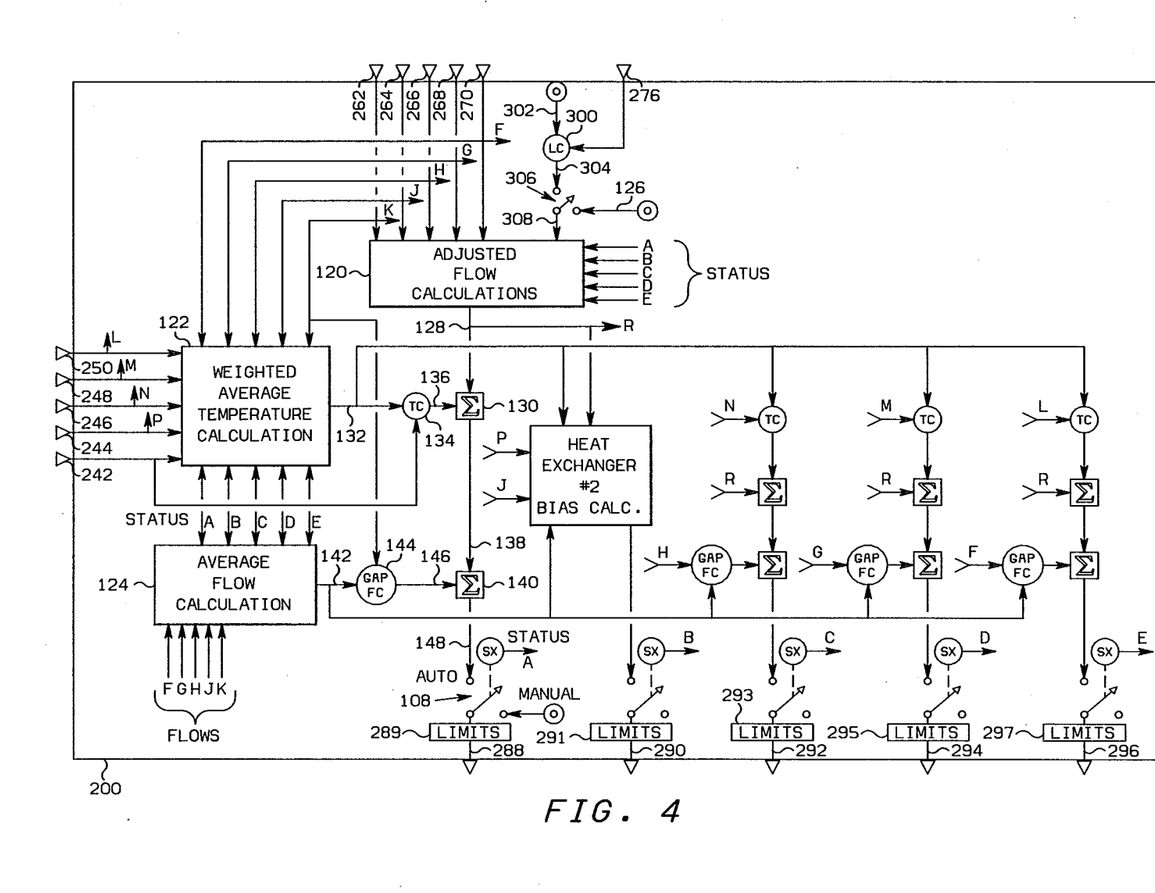
FIG. 4 is a flow diagram of the control logic utilized to estblish the control signals illustrated in FIG. 3 based on the process measurements illustrated in FIG. 3.

Referring now to FIG. 4 there is illustrated control logic utilized to establish the five control signals illustrated in FIG. 3. Since the control logic for establishing control signals 288, 290, 292, 294 and 296 illustrated in FIG. 3 is identical to the logic for establishing control signal 70, 72 and 74 which are previously described in reference to FIG. 2, generation of control signals 288, 290, 292, 294 and 296 will not be described in detail. However, like reference numerals are used in FIG. 2 and FIG. 4 for computer blocks in which identical logic is performed.

In addition signal 276 which is representative of a liquid level in fractionator 274 is provided to level controller 300. Signal 302 which is an operator entered set point is also provided to level controller 300. In response to signals 276 and 302 level controller 300 provides an output signal 304 which is responsive to the difference between signals 276 and 302. Signal 304 is scaled so as to be representative of the total flow to the preheat system flowing in conduit means 202 required to maintain the actual liquid level represented by signal 276 substantially equal to the desired liquid level represented by signal 302.

Switch 306 is effective for selecting between signals 304 which is representative of the total flow rate required to maintain a desired liquid level in fractionator 274 and signal 126 which as illustrated in FIG. 2 is representative of a desired total flow rate, to establish signal 308. Signal 308 is provided to computer block 120 and is utilized for the $F_t$ term in equation 1.

In summary, automatically manipulating the division of flow through a group of heating exchange passes in response to temperature measurements so long as a maximum flow in a pass is not exceeded, provides a technique by which temperature balancing of the individual passes is maintained without disturbing the total flow through the heating system. In addition if one or more passes of the group cannot be manipulated to effect a desired flow division, the control scheme automatically balances the temperature of the remaining passes in the group.

The invention has been described in terms of preferred embodiments are illustrated in FIGS. 1–4. Specific components used in the practice of the invention as illustrated in FIGS. 1 and 3 such as temperature transducers 40, 42, and 44 in FIG. 1 and temperature transducers 232, 234, 236, 238 and 240 in FIG. 3, flow transducers 52, 54 and 56 in FIG. 1 and flow transducers 252, 254, 256, 258 and 260 in FIG. 3, control valves 32, 34 and 36 in FIG. 1 and control valves 222, 224, 226, 228 and 230 in FIG. 3, and flow controllers 76, 78 and 80 in FIG. 1 and flow controllers 278, 280, 282, 284 and 280 in FIG. 3 are each well known, commercially avaiable control components such as are described at length in Perry's Chemical Engineering Handbook, 5th Edition, Chapter 22, McGraw-Hill.

For reasons of brevity conventional auxiliary equipment such as pumps, additional heat exchangers, additional measurement and control devices, etc. have not been included in the above description as they play no part in the explanation of the invention.

While the invention has been described in terms of the presently preferred embodiment, reasonable variations and modifications are possible by those skilled in the art and such variations and modification are within the scope of the described invention and the appended claims.

That which is claimed is:

1. Apparatus comprising:
   a heating system having at least a first and a second heating coil extending in parallel relationship through said heating system;
   means for supplying a first fluid stream to said heating system;
   means for splitting said first stream into at least a second and a third stream, and for passing said second stream through said first heating coil to heat said second stream and for passing said third stream through said second heating coil to heat said third stream;
   a first and a second flow control means for respectively controlling the flow rate of said second stream and said third stream, wherein a first automatic/manual selector switch is associated with said first flow control means and a second automatic/manual selector switch is associated with said second flow control means, and wherein the automatic position is selected for at least said first flow control means;
   means for establishing first and second signals which are on-off type status signals respectively representative of the position of said first and second automatic/manual switches, and wherein a first status indicates automatic control in response to a computed set point and a second status indicates manual control in response to a manually entered set point;
   means for establishing a third signal representative of the desired total flow rate of said at least second and third streams;
   means for establishing a fourth signal representative of the actual flow rate of said second stream;

means for establishing a fifth signal representative of the actual flow rate of said third stream;

means for combining at least said second, and fifth signals to establish a sixth signal representative of the total flow rate controlled by at least said second controller if at least said second signal indicates said second status, so that said sixth signal indicates the total flow through said heating system that is manually controlled;

means, responsive to said first status of at least said first and second signals, for establishing a seventh signal which is equal to the number of streamns that are automatically controlled;

means, responsive to said third, sixth and seventh signals, for establishing an eighth signal which is representative of an adjusted flow rate for the number of streams represented by said seventh signal, required to maintain the actual total flow rate of said at least second and third fluid streams substantially equal to the desired total flow represented by said third signal;

means for establishing a ninth signal representative of the actual fluid temperature at the outlet of said first heating coil;

means for establishing a tenth signal representative of the actual fluid temperature at the outlet of said second heating coil;

means, responsive to said fourth, fifth, seventh, ninth and tenth signals, for establishing an eleventh signal representative of a weighted average outlet temperature for the number of streams represented by said seventh signal, so that said weighted average outlet temperature is responsive to the actual temperature and the actual flow rate of fluid heated in at least said first heating coil;

means for comparing said ninth signal and said eleventh signal and for establishing a twelfth signal which is responsive to the difference between said ninth signal and said eleventh signal, wherein said twelfth signal is scaled so as to be representatie of the change in flow rate of said second stream required to maintain the actual temperature at the outlet of said first heating coil substantially equal to the weighted average temperature represented by said eleventh signal;

means for combining said eighth signal and said twelfth signal to establish a thirteenth signal which is representative of the flow rate of said second fluid stream required to maintain the actual temperature at the outlet of said first heating coil substantially equal to said eleventh signal; and means for manipulating the flow rate of said second stream in response to said thirteenth signal.

2. Apparatus in accordance with claim 1 wherein said means for manipulating the flow rate of said second stream in response to said thirteenth signal additionally comprises:

means responsive to said fourth, fifth, and seventh signals for establishing a fourteenth signal representative of an average flow for the number of streams represented by said seventh signal, so that the average flow is responsive to the actual flow rate of fluid heated in said at least first heating coil;

means for comparing said fourteenth signal and said fourth signal in a GAP flow controller having a deadband and for establishing a fifteenth signal which is responsive to the difference between said fourteenth signal and said fifteenth signal, wherein said fifteenth signal is scaled so as to be representative of the change in flow rate of said second stream required to maintain the actual flow rate of said second stream substantially within said deadband provided in said GAP flow controller;

means for combining said fifteenth signal and said thirteenth signal to establish a sixteenth signal which is representative of the flow rate of said second stream required to maintain the actual temperature at the outlet of said first heating coil substantially equal to said eleventh signal unless the flow rate represented by said sixteenth signal exceeds said average flow represented by said fourteenth signal by more than said deadband in said GAP flow controller, and wherein said sixteenth signal is representative of the flow rate in said second stream required to maintain the actual flow substantially within said deadband of said GAP flow controller if the actual flow rate in said second stream exceeds the average flow represented by said fourteenth signal by more than the deadband of said GAP controller; and means for manipulating the flow rate of said second stream in response to said sixteenth signal.

3. Apparatus in accordance with claim 1 wherein said means for establishing said sixth signal comprises:

means for totalizing at least said fifth signal if said second signal indicates said second status, to establish said sixth signal.

4. Apparatus in accordance with claim 1 wherein said means for establishing said eighth signal comprises:

means for subtracting said sixth signal from said third signal to establish a fourteenth signal representative of the total automatically controlled flow required to maintain the actual flow for said at least second and third streams substantially equal to said third signal; and means for dividing said fourteenth signal by said seventh signal to establish said eighth signal.

5. Apparatus in accordance with claim 1 wherein said means for establishing said eleventh signal comprises:

means for multiplying said fourth signal and said ninth signal to establish a fourteenth signal representative of a flow temperature product for said second stream;

means for multiplying said fifth signal by said tenth signal to establish a fifteenth signal representative of a flow temperature product for said third stream if said second signal indicates said first status;

means for summing said fourteenth signal and said fifteenth signal to establish a sixteenth signal if said second signal indicates said first status;

means for totalizing at least said fourteenth signal to establish said sixteenth signal if said second signal indicates said second status;

means for summing said fourth signal and said fifth signal to establish a seventeenth signal representative of the total flow that is automatically controlled if said second signal indicates said first status;

means for totalizing at least said fourth signal to establish said seventeenth signal if said second signal indicates said second status; and means for dividing said sixteenth signal by said seventeenth signal to establish said eleventh signal.

6. Apparatus in accordance with claim 2 wherein said means for establishing said fourteenth signal comprises:

means for totalizing at least said fourth signal to establish a nineteenth signal if said second signal indicates said second status;

means for summing said fourth signal and said fifth signal to establish a said nineteenth signal representative of the total flow that is automatically controlled if said second signal indicates said first status; and means for dividing said nineteenth signal by said seventh signal to establish said fourteenth signal.

7. Apparatus in accordance with claim 2 wherein said first fluid stream is crude oil and said heating system is a furnace having a plurality of parallel passes.

8. Apparatus in accordance with claim 2 wherein said first fluid stream is crude oil and said heating system includes a plurality of furnaces and a plurality of liquid to liquid heat exchangers.

9. A method for controlling the flow of a fluid to be heated in a heating system wherein a first stream is split into at least second and third streams with said second stream being provided to a first pass and said third stream being provided to a second pass and wherein a first flow controller having a first automatic/manual selector switch with the automatic position selected, controls said second stream, and a second flow controller having a second automatic/manual switch, controls said third stream, and further wherein the temperature at the outlet of said first pass and the outlet of said second pass is controlled said method comprising the steps of:

establishing first and second signals which are on-off type status signals respectively representative of the position of said first and second automatic manual switches, and wherein a first status indicates automatic control in response to a computed set point and a second status indicates manual control in response to a manually entered set point;

establishing a third signal representative of the desired total flow rate of said at least second and third streams;

establishing a fourth signal representative of the actual flow rate of said second stream;

establishing a fifth signal representative of the actual flow rate of said third stream;

combining at least said second, and fifth signals to establish a sixth signal representative of the total manually controlled flow through said heating system;

establishing a seventh signal which is equal to the number of streams that are automatically controlled, wherein said seventh signal is responsive to at least said first and second signals;

establishing an eighth signal which is representative of an adjusted flow rate for the number of streams represented by said seventh signal which is required to maintain the actual total flow through said heating system substantially equal to the desired total flow represented by said third signal, wherein said eighth signal is responsive to said third, sixth and seventh signals;

establishing a ninth signal representative of the actual fluid temperature at the outlet of said first pass;

establishing a tenth signal representative of the actual fluid temperature at the outlet of said second pass;

establishing an eleventh signal representative of a weighted average temperature for the number of streams represented by said seventh signal, so that the weighted average temperature is responsive to the actual temperature and the actual flow rate of fluid heated in said heating system, and wherein said eleventh signal is responsive to said fourth, fifth, seventh, ninth and tenth signals;

comparing said ninth signal and said eleventh signal and for establishing a twelfth signal which is responsive to the difference between said ninth signal and said eleventh signal, wherein said twelfth signal is scaled so as to be representative of the change in flow rate of said second stream required to maintain the temperature at the outlet of said first pass substantially equal to the weighted average temperature represented by said eleventh signal;

combining said eighth signal and said twelfth signal to establish a thirteenth signal which is representative of the flow rate of said second fluid stream required to maintain the actual temperature at the outlet of said first pass substantially equal to said eleventh signal; and manipulating the flow rate of said second stream in response to said thirteenth signal.

10. A method in accordance with claim 9 wherein said step for manipulating the flow rate of said second stream in response to said thirteenth signal additionally comprises the steps of:

establishing a fourteenth signal representative of an average flow for the number of streams represented by said seventh signal so that said average flow is responsive to the actual flow rate of fluid heated in at least said first pass;

comparing said fourteenth signal and said fourth signal in a GAP flow controller having a deadband and for establishing a fifteenth signal which is responsive to the difference between said fourteenth signal and said fifteenth signal, wherein said fifteenth signal is scaled so as to be representative of the change in flow rate of said second stream required to maintain the actual flow rate of said second stream substantially within the deadband provided in said GAP flow controller;

combining said fifteenth signal and said thirteenth signal to establish a sixteenth signal which is representative of the flow rate of said second stream required to maintain the actual temperature at the outlet of said first pass substantially equal to said eleventh signal unless the flow rate represented by said sixteenth signal exceeds said average flow represented by said fourteenth signal by more than said deadband in said GAP flow controller, and wherein said sixteenth signal is representative of the flow rate in said second stream required to maintain the actual flow substantially within said deadband of said GAP flow controller if said actual flow rate in said second stream exceeds said average flow represented by said fourteenth signal by more than said deadband of said GAP controller; and manipulating the flow rate of said second stream in response to said sixteenth signal.

11. A method in accordance with claim 9 wherein said step for establishing said sixth signal comprises:

totalizing at least said fifth signal if said second signal indicates said second status, to establish said sixth signal.

12. A method in accordance with claim 9 wherein said step for establishing said eighth signal comprises:

subtracting said sixth signal from said third signal to establish a fourteenth signal representative of the total automatically controlled flow required to maintain the actual flow for said at least second and third streams substantially equal to said third signals;

dividing said fourteenth signal by said seventh signal to establish said eighth signal.

13. A method in accordance with claim 9 wherein said step for establishing said eleventh signal comprises:

multiplying said fourth signal and said ninth signal to establish a fourteenth signal representative of a flow temperature product for said second stream;

multiplying said fifth signal by said tenth signal to establish a fifteenth signal representative of a flow temperature product for said third stream if said second signal indicates said first status;

summing said fourteenth signal and said fifteenth signal to establish a sixteenth signal if said second signal indicates said first status;

totalizing at least said fourteenth signal to establish said sixteenth signal if said second signal indicates said second status;

summing said fourth signal and said fifth signal to establish a seventeenth signal representative of the total flow that is automatically controlled if said second signal indicates said first status;

totalizing at least said fourth signal to establish said seventeenth signal if said second signal indicates said second status; and dividing said sixteenth signal by said seventeenth signal to establish said eleventh signal.

14. A method in accordance with claim 10 wherein said means for establishing said fourteenth signal comprises:

summing said fourth signal and said fifth signal to establish a nineteenth signal representative of the total flow that is automatically controlled if said second signal indicates said first status;

totalizing at least said fourth signal to establish said nineteenth signal if said second signal indicates said second status; and dividing said nineteenth signal by said seventh signal to establish said fourteenth signal.

15. A method in accordance with claim 10 wherein said first fluid stream is crude oil and said heating system is a furnace having a plurality of parallel passes.

16. A method in accordance with claim 10 wherein said first fluid stream is crude oil and said heating system includes a plurality of furnaces and a plurality of liquid to liquid heat exchangers.

* * * * *